US011553097B2

(12) United States Patent
Iwadate et al.

(10) Patent No.: US 11,553,097 B2
(45) Date of Patent: Jan. 10, 2023

(54) IMAGE FORMING APPARATUS HAVING IMAGE POSITION ADJUSTMENT

(71) Applicant: CANON KABUSHIKI KAISHA, Tokyo (JP)

(72) Inventors: Shinnosuke Iwadate, Ibaraki (JP); Ryusuke Ito, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/361,894

(22) Filed: Jun. 29, 2021

(65) Prior Publication Data
US 2022/0006909 A1    Jan. 6, 2022

(30) Foreign Application Priority Data

Jul. 3, 2020    (JP) .............................. JP2020-115786
May 18, 2021   (JP) .............................. JP2021-084003

(51) Int. Cl.
*H04N 1/00*   (2006.01)
*H04N 1/047*  (2006.01)

(52) U.S. Cl.
CPC ....... *H04N 1/0058* (2013.01); *H04N 1/00045* (2013.01); *H04N 1/047* (2013.01)

(58) Field of Classification Search
CPC ... H04N 1/0058; H04N 1/00045; H04N 1/047
USPC ...................................................... 358/498
See application file for complete search history.

(56) References Cited

U.S. PATENT DOCUMENTS

| 7,760,370 B2 | 7/2010 | Oki | |
|---|---|---|---|
| 10,520,872 B2* | 12/2019 | Maeda | H04N 1/3872 |
| 2015/0286901 A1* | 10/2015 | Yano | H04N 1/29 358/3.24 |
| 2021/0274051 A1* | 9/2021 | Sekita | H04N 1/00045 |
| 2021/0314453 A1* | 10/2021 | Omata | H04N 1/00779 |
| 2021/0356894 A1* | 11/2021 | Nishikata | G03G 15/6558 |

OTHER PUBLICATIONS

Ryusuke Ito et al., U.S. Appl. No. 17/361,871, filed Jun. 29, 2021.

* cited by examiner

*Primary Examiner* — Gabriel I Garcia
(74) *Attorney, Agent, or Firm* — Venable LLP

(57) ABSTRACT

An image forming apparatus includes an image former to form an image on a sheet based on an image forming condition for adjusting a position of the image on the sheet, a heater to fix the image on the sheet, and an image reader to read the image on the sheet, the image reader being arranged downstream from the heater in a conveyance direction in which the sheet is conveyed. A processor controls the image former to form an image including a mark on a sheet, controls the image reader to read the mark, generates the image forming condition based on a reading result of the mark by the image reader, and controls to determine, in a case where a second image including the mark is formed by the image former after the first image including the mark is formed by the image former, whether to form a chart including the mark on the sheet before the second image is formed based on an elapsed time after forming the first image.

7 Claims, 9 Drawing Sheets

IMAGE FORMING APPARATUS HAVING IMAGE POSITION ADJUSTMENT

BACKGROUND OF THE INVENTION

Field of the Invention

The present disclosure relates to an image forming apparatus, for example, a printer, a copying machine, a facsimile machine, or a multifunction apparatus.

Description of the Related Art

Printed products generated by commercial printing machines require stabilized printing position accuracy for front and back sides of a sheet. Therefore, in an image forming apparatus, automatic adjustment (hereinafter referred to as "front-and-back auto adjustment") for automatically stabilizing the printing position accuracy for the front and back sides of the sheet is performed. Through the front-and-back auto adjustment, for example, correction values for front and back printing positions (image forming positions) are set for each sheet feeding deck. At a time of printing, a writing start position of an image is adjusted based on the correction value set for the sheet feeding deck from which the sheet has been fed. The writing start position of the image is adjusted by, for example, offsetting an amount corresponding to the correction value. The printing positions are adjusted through the adjustment of each writing start position.

In U.S. Pat. No. 7,760,370 B2, there is disclosed an image forming apparatus configured to stabilize the printing position accuracy. In order to stabilize the printing position accuracy, this image forming apparatus creates a chart for adjustment by printing, on the sheet, an image for adjustment serving as a mark of the printing position. The chart for adjustment has the image for adjustment read by an image reading sensor provided in a conveyance path for the sheet. The image forming apparatus feeds back a reading result of the image for adjustment to image forming conditions to adjust geometric characteristics of the image, for example, the printing position and an inclination of the image.

Optimum correction values for the geometric characteristics of the front and back images change depending on environmental conditions including an in-machine temperature of the image forming apparatus at the time of printing and sheet conditions including moisture absorption of the sheet. Therefore, it is preferred that the front-and-back auto adjustment be appropriately performed. In view of this, the images for adjustment (registration marks) for adjusting the geometric characteristics, which are formed in a cut-off area of the printed product, are used to sequentially adjust the correction values for the geometric characteristics of the front and back images. However, when the environmental conditions and sheet conditions of the image forming apparatus change due to a longer time interval after the previous adjustment, the optimum correction values for the geometric characteristics of the front and back images may change. In this case, there is such a fear that the geometric characteristics of the front and back images may not be corrected by the optimum correction values in the subsequent job.

In addition, in general, a user can select whether to enable or disable the front-and-back auto adjustment. When the front-and-back auto adjustment is set disabled, the front-and-back auto adjustment is not executed during job printing, and hence the geometric characteristics are adjusted with fixed values while the correction values are not updated. For example, in a case in which a job having the front-and-back auto adjustment set disabled is executed after a job having the front-and-back auto adjustment set enabled, the last correction values set for the job having the front-and-back auto adjustment set enabled are used for the job having the front-and-back auto adjustment set disabled. The correction values are not updated for the job having the front-and-back auto adjustment set disabled. After that, when printing is started with a job having the front-and-back auto adjustment set enabled, there is such a fear that the environmental conditions and sheet conditions of the image forming apparatus may have changed due to a longer time interval after the previous update of the correction values. Therefore, there is such a fear that adjustment for optimum geometric characteristics may not be performed. The present disclosure has been made in view of the above-mentioned problems, and has an object to provide an image forming apparatus configured to constantly maintain optimum correction values for geometric characteristics of front and back images.

SUMMARY OF THE INVENTION

An image forming apparatus of the present disclosure includes: an image forming unit configured to form an image on a sheet based on a job, wherein the image forming unit being controlled based on an image forming condition; a conveying unit configured to convey the sheet in a conveyance path; an image reading unit configured to read a test image on the sheet conveyed by the conveying unit; and a controller configured to: control the image forming unit to form the image and the test image on a same sheet; control the reading unit to read the test image on the same sheet; and generate the image forming condition based on a reading result of the test image by the reading unit, wherein, in a case where the image forming unit forms images based on a first job in which a first image and the test image are formed on a same first sheet and a second job in which a second image and the test image are formed on a same second sheet, the controller controls, based on a time period in which no image is formed on a sheet between the first job and the second job, whether or not to form another test image on another sheet by the image forming unit before the image forming unit forms the second image and the test image on the same second sheet, and wherein the controller controls the reading unit to read the another test image on the another sheet, and wherein the controller generates the image forming condition based on a reading result of the another test image by the reading unit.

Further features of the present invention will become apparent from the following description of exemplary embodiments (with reference to the attached drawings).

DESCRIPTION OF THE EMBODIMENTS

Now, an embodiment of the present disclosure is described in detail with reference to the accompanying drawings.

<Image Processing System>

Figure 1:
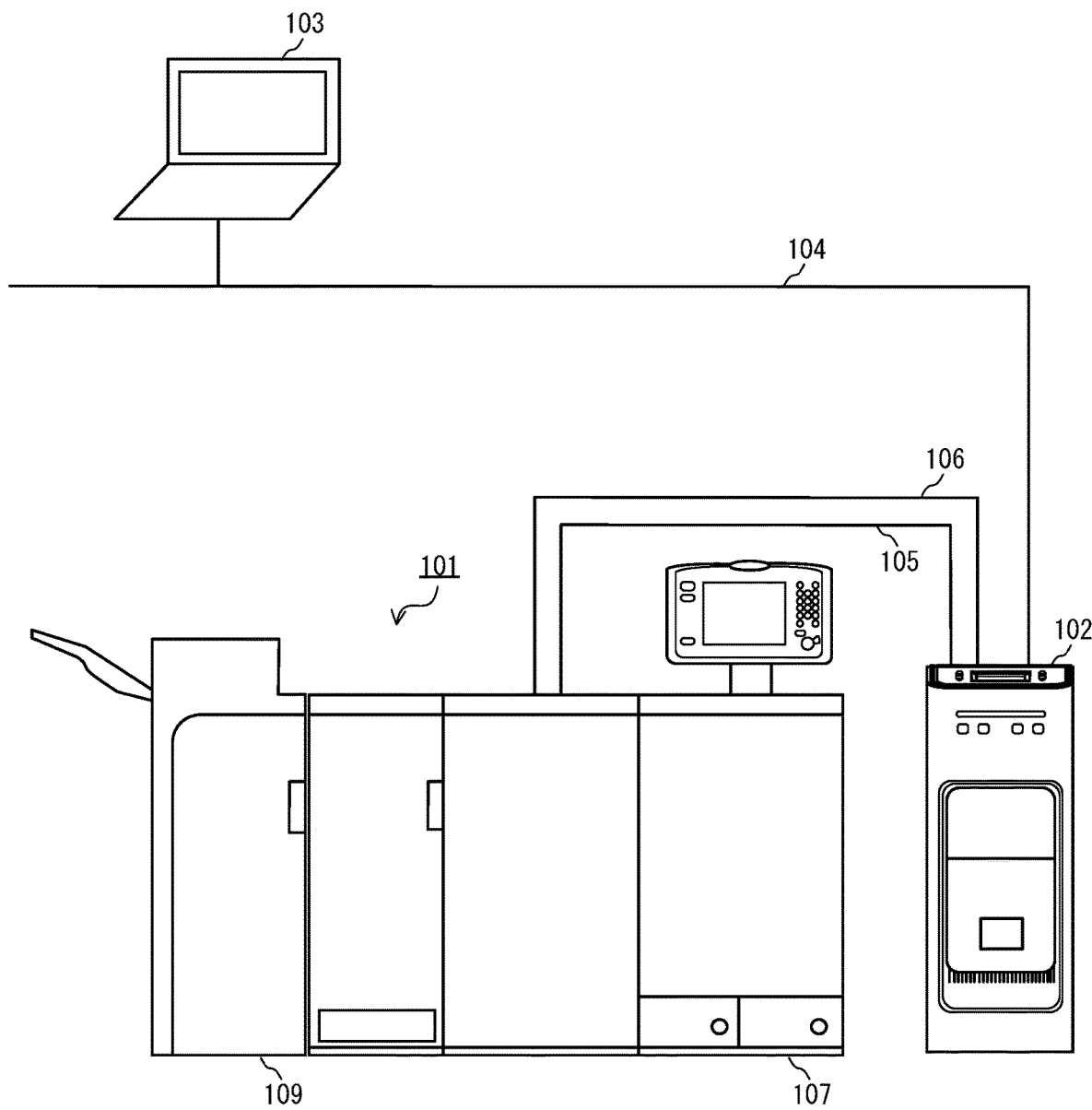
FIG. 1 is a configuration diagram of an image processing system.

FIG. 1 is a configuration diagram of an image processing system including an image forming apparatus according to this embodiment. The image processing system includes an image forming apparatus 101 and an external controller 102. Examples of the image forming apparatus 101 include a multifunction apparatus and a multifunction peripheral (MFP). Examples of the external controller 102 include an image processing controller, a digital front end (DFE), and a print server.

The image forming apparatus 101 and the external controller 102 are connected to each other so as to enable communication therebetween through an internal local area network (LAN) 105 and a video cable 106. The external controller 102 is connected to a client personal computer (PC) 103 through an external LAN 104. The external controller 102 is configured to obtain a print instruction (print job) from the client PC 103.

A printer driver having a function of converting image data into a Page Description Language that can be processed by the external controller 102 installed on the client PC 103. A user can instruct printing through the printer driver by various applications. The printer driver transmits image data to the external controller 102 based on a print job instructed by the user. The external controller 102 receives the print job including the image data from the client PC 103, performs data analysis and rasterization processing on the image data, and instructs the image forming apparatus 101 to print (to perform image formation) based on the image data.

The image forming apparatus 101 is configured by connecting a plurality of apparatus having different functions including a printing apparatus 107 to one another, and can perform complicated printing processing including bookbinding. The image forming apparatus 101 according to this embodiment includes the printing apparatus 107 and a finisher 109. The printing apparatus 107 is configured to form an image on a sheet fed from a sheet feeding unit provided at a lower part of a main body, through use of a developer (for example, toner). The printing apparatus 107 forms yellow (Y), magenta (M), cyan (C), and black (K) images. A full-color image in which the images in the respective colors are superimposed on one another is formed on the sheet. The sheet having the image formed thereon is conveyed from the printing apparatus 107 to the finisher 109. The finisher 109 stacks such sheets having images formed thereon.

This image processing system is configured by connecting the external controller 102 to the image forming apparatus 101, but the external controller 102 is not always required. For example, the image forming apparatus 101 may be configured to obtain the print job including the image data directly from the client PC 103 through the external LAN 104. In this case, the image forming apparatus 101 is configured to perform the data analysis and rasterization processing that are supposed to be performed by the external controller 102. That is, the image forming apparatus 101 and the external controller 102 may be integrally configured.

<System Configuration>

Figure 2:
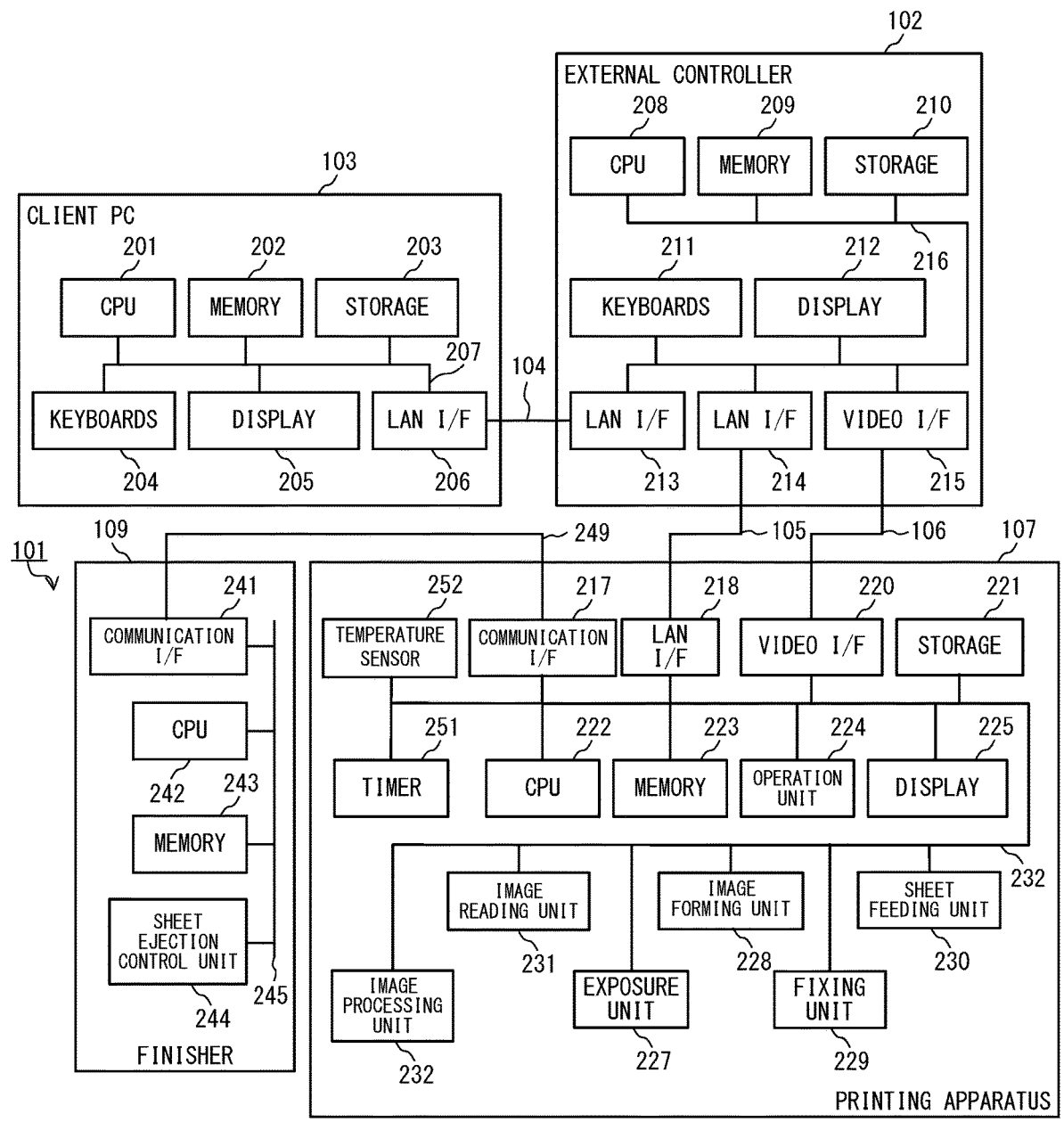
FIG. 2 is a system configuration diagram.

FIG. 2 is a system configuration diagram for illustrating how to control an operation of the image processing system. In this case, a controller configured to control an operation of each of the image forming apparatus 101, the external controller 102, and the client PC 103 is described.

Printing Apparatus

The printing apparatus 107 includes a communication interface (I/F) 217, a LAN I/F 218, and a video I/F 220 in order to communicate to/from other apparatus. The printing apparatus 107 includes a central processing unit (CPU) 222, a memory 223, a storage 221, an image reading unit 231, and an image processing unit 232 in order to control the operation of the printing apparatus 107. The printing apparatus 107 includes an exposure unit 227, an image forming unit 228, a fixing unit 229, and a sheet feeding unit 230 in order to form an image. The printing apparatus 107 includes an operation unit 224 and a display 225 as user interfaces. The printing apparatus 107 includes a timer 251 and a temperature sensor 252 in order to adjust correction values for optimally correcting geometric characteristics of images on front and back sides. In this case, the geometric characteristics of the image refer to, for example, squareness and a printing position of the image on the sheet. Those components are connected to one another through a system bus 233 so as to enable communication to/from one another.

The communication I/F 217 is connected to the finisher 109 through a communication cable 249, and is configured to control communication to/from the finisher 109. When the printing apparatus 107 and the finisher 109 operate in cooperation with each other, information and data are transmitted and received through intermediation of the communication I/F 217. The LAN I/F 218 is connected to the external controller 102 through the internal LAN 105, and is configured to control communication to/from the external controller 102. The printing apparatus 107 receives a print setting from the external controller 102 through intermediation of the LAN I/F 218. The video I/F 220 is connected to the external controller 102 through the video cable 106, and is configured to control communication to/from the external controller 102. The printing apparatus 107 receives image data representing an image to be formed from the external controller 102 through intermediation of the video I/F 220.

The CPU 222 is configured to execute computer programs stored in the storage 221 to comprehensively perform image processing and printing control. The memory 223 is configured to provide a work area for the CPU 222 to execute various kinds of processing. In a case of performing image forming processing, the CPU 222 controls the exposure unit 227, the image forming unit 228, the fixing unit 229, and the sheet feeding unit 230.

The exposure unit 227 includes a photoconductor, a charging wire configured to charge the photoconductor, and a light source configured to expose the photoconductor charged by the charging wire to light in order to form an electrostatic latent image on the photoconductor. The photoconductor is, for example, a photosensitive belt having a photosensitive layer formed on a surface of a belt-like elastic member or a photosensitive drum having a photosensitive layer formed on a surface of a cylinder. In place of the charging wire, a charging roller may be used. The exposure unit 227 is configured to charge a surface of the photoconductor to a uniform negative potential through use of the charging wire. The exposure unit 227 is also configured to output laser light based on the image data from the light source. The laser light is scanned across the surface of the photoconductor that has been uniformly charged. Thus, a potential of the photoconductor changes at a position irradiated with the laser light, and an electrostatic latent image is formed on the surface of the photoconductor. Four photoconductors are provided in correspondence with the four colors of yellow (Y), magenta (M), cyan (C), and black (K). Electrostatic latent images corresponding to images in mutually different colors are formed on the four photoconductors.

The image forming unit 228 includes a developing unit. The image forming unit 228 is further comprising a transfer unit, and a toner replenisher. The image forming unit 228 is configured to transfer a toner image formed on the photoconductor to the sheet. The developing unit is configured to form a toner image by causing toner charged to a negative polarity to adhere from the developing sleeve to an electrostatic latent image formed on the surface of the photoconductor. Four developing unit are provided in correspondence with the four colors of yellow (Y), magenta (M), cyan (C), and black (K). The developing unit visualizes the electrostatic latent image on the photoconductor through use of the toner of the corresponding color.

The transfer unit includes an intermediate transfer belt, and is configured to transfer the toner image from the photoconductor onto the intermediate transfer belt. A primary transfer roller is provided at a position opposing to each photoconductor across the intermediate transfer belt. When a positive potential is applied to each primary transfer roller, the toner images are transferred from the four photoconductors onto the intermediate transfer belt while being superimposed on one another. Thus, a full-color toner image is formed on the intermediate transfer belt. The toner image formed on the intermediate transfer belt is transferred onto the sheet by a secondary transfer roller described later. The secondary transfer roller is configured to transfer the full-color toner image from the intermediate transfer belt onto the sheet when a positive potential is applied to the secondary transfer roller.

The fixing unit 229 is configured to fix the transferred toner image to the sheet. The fixing unit 229 includes a heater and a roller pair. The fixing unit 229 heats and pressurizes the toner image on the sheet by the heater and the roller pair to melt the toner image and fix the toner image to the sheet. Thus, the image is formed on the sheet. The sheet feeding unit 230 includes a conveyance roller and various sensors in a conveyance path, and is configured to control a sheet feeding operation.

The image reading unit 231 is configured to read the image formed on the conveyed sheet based on an instruction received from the CPU 222. For example, in a case of adjusting image forming conditions, the CPU 222 causes the image reading unit 231 to read images for adjustment of the image forming conditions, which are formed on the sheet. The operation unit 224 is an input device configured to receive input of various settings and operation instructions from the user. Examples of the operation unit 224 include various input keys and a touch panel. The display 225 is an output device configured to display setting information on the image forming apparatus 101 and a processing status (status information) of the print job.

The timer 251 is configured to count a time. The CPU 222 obtains a current date and time based on a count value obtained by the timer 251. The temperature sensor 252 is configured to measure an in-machine temperature of the printing apparatus 107. The CPU 222 obtains the in-machine temperature, which is one of environmental conditions, based on a measurement result obtained by the temperature sensor 252. As the environmental condition, a humidity may be obtained in addition to the temperature.

Finisher

The finisher 109 is configured to execute staple processing on, for example, printed products output from the printing apparatus 107. The finisher 109 includes a communication I/F 241, a CPU 242, a memory 243, and a sheet ejection control unit 244. Those components are connected to one another through a system bus 245 so as to enable communication to/from one another. The communication I/F 241 is connected to the printing apparatus 107 through the communication cable 249, and is configured to control communication to/from the printing apparatus 107. When the finisher 109 and the printing apparatus 107 operate in cooperation with each other, information and data are transmitted and received through intermediation of the communication I/F 241. The CPU 242 is configured to execute control programs stored in the memory 243 to perform various kinds of control required for sheet delivery. The memory 243 is configured to store the control programs. The memory 243 is also configured to provide a work area for the CPU 242 to execute various kinds of processing. The sheet ejection control unit 244 is configured to deliver the conveyed sheet based on an instruction received from the CPU 242.

External Controller

The external controller 102 includes a LAN I/F 213, a LAN I/F 214, and a video I/F 215 in order to communicate to/from other apparatus. The external controller 102 includes a CPU 208, a memory 209, and a storage 210 in order to control the operation of the external controller 102. The external controller 102 includes a keyboard 211 and a display 212 as user interfaces. Those components are connected to one another through a system bus 216 so as to enable communication to/from one another.

The LAN I/F 213 is connected to the client PC 103 through the external LAN 104, and is configured to control communication to/from the client PC 103. The external controller 102 obtains the print job from the client PC 103 through intermediation of the LAN I/F 213. The LAN I/F 214 is connected to the printing apparatus 107 through the internal LAN 105, and is configured to control communication to/from the printing apparatus 107. The external controller 102 transmits the print setting to the printing apparatus 107 through intermediation of the LAN I/F 214. The video I/F 215 is connected to the printing apparatus 107 through the video cable 106, and is configured to control communication to/from the printing apparatus 107. The external controller 102 transmits the image data to the printing apparatus 107 through intermediation of the video I/F 215.

The CPU 208 is configured to execute computer programs stored in the storage 210 to comprehensively perform processing including reception of the image data transmitted from the client PC 103, RIP processing, and transmission of the image data to the image forming apparatus 101. The memory 209 is configured to provide a work area for the CPU 208 to execute various kinds of processing. The keyboard 211 is an input device configured to receive input of various settings and operation instructions from the user. The display 212 is an output device configured to display information on an execution application of the external controller 102 as a still image or a moving image.

Client PC

The client PC 103 includes a CPU 201, a memory 202, a storage 203, a keyboard 204, a display 205, and a LAN I/F 206. Those components are connected to one another through a system bus 207 so as to enable communication to/from one another.

The CPU 201 is configured to execute computer programs stored in the storage 203 to control the operation of the client PC 103. In this embodiment, the CPU 201 creates image data and transmits a print job. The memory 202 is configured to provide a work area for the CPU 201 to execute various kinds of processing. The keyboard 204 and the display 205 are user interfaces. The keyboard 204 is an input device configured to receive instructions from the user. The display 205 is an output device configured to display information on an execution application of the client PC 103 as a still image or a moving image. The LAN I/F 206 is connected to the external controller 102 through the external LAN 104, and is configured to control communication to/from the external controller 102. The client PC 103 is configured to transmit the print job including the image data to the external controller 102 through the LAN I/F 206.

The external controller 102 and the image forming apparatus 101 are connected through the internal LAN 105 and the video cable 106, but may be connected, for example, only through a video cable as long as data required for printing can be transmitted and received therebetween. It suffices that each of the memory 202, the memory 209, the memory 223, and the memory 243 is a storage device for holding data and programs. As those memories, it is possible to use, for example, a volatile random access memory (RAM), a non-volatile read only memory (ROM), a storage, and a universal serial bus (USB) memory.

<Configuration of Image Forming Apparatus>

Figure 3:
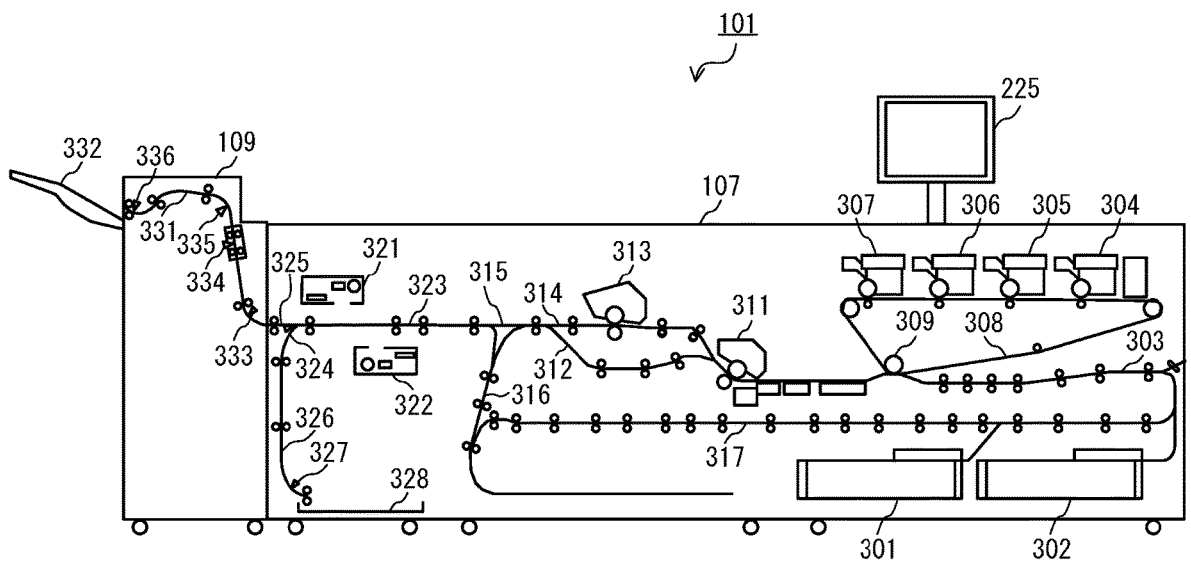
FIG. 3 is a configuration diagram of an image forming apparatus.

FIG. 3 is a configuration diagram of the image forming apparatus 101. The display 225 is provided at an upper part of the printing apparatus 107. The display 225 is configured to display information for a printing status and settings of the image forming apparatus 101. The sheet having the image formed thereon by the printing apparatus 107 is conveyed to the finisher 109 provided in the subsequent stage.

The printing apparatus 107 includes a plurality of sheet feeding decks 301 and 302 and a conveyance path 303 as the sheet feeding unit 230. Mutually different types of sheets can be stored in the sheet feeding decks 301 and 302. Of the sheets stored in the sheet feeding decks 301 and 302, an topmost sheet is separated and fed to the conveyance path 303. The printing apparatus 107 includes, as the exposure unit 227, image forming units 304, 305, 306, and 307 for forming an image. The printing apparatus 107 is configured to form a color image. To that end, the image forming unit 304 is configured to form a black (K) image (toner image). The image forming unit 305 is configured to form a cyan (C) image (toner image). The image forming unit 306 is configured to form a magenta (M) image (toner image). The image forming unit 307 is configured to form a yellow (Y) image (toner image).

The printing apparatus 107 includes, as the image forming unit 228, a secondary transfer roller 309 and an intermediate transfer belt 308 onto which the toner images are to be transferred from the image forming units 304, 305, 306, and 307. The intermediate transfer belt 308 is configured to be rotated clockwise in FIG. 3, and the toner images are superimposed on one another and transferred in the order of the image forming unit 307, the image forming unit 306, the image forming unit 305, and the image forming unit 304. Thus, a full-color toner image is formed on the intermediate transfer belt 308. The intermediate transfer belt 308 is rotated, to thereby carry the toner image to the secondary transfer roller 309. The sheet is conveyed to the secondary transfer roller 309 at a timing at which the toner image is carried to the secondary transfer roller 309. The secondary transfer roller 309 is configured to transfer the toner image on the intermediate transfer belt 308 onto the conveyed sheet.

The printing apparatus 107 includes, as the fixing unit 229, a first fixing device 311 and a second fixing device 313. The first fixing device 311 and the second fixing device 313 have the same configuration, and are each configured to fix the toner image to the sheet. To that end, the first fixing device 311 and the second fixing device 313 each include a pressure roller and a heating roller. The sheet is heated and pressurized by passing between the pressure roller and the heating roller to have the toner image melted and press-fixed. The sheet that has passed through the second fixing device 313 is conveyed to a conveyance path 314. The second fixing device 313 is arranged downstream of the first fixing device 311 in a sheet conveying direction, and is used for adding a gloss to the image on the sheet, which has been subjected to fixing processing by the first fixing device 311, and for ensuring fixability. For that reason, the second fixing device 313 may not be used depending on the type of sheet and the kind of the image forming processing. A conveyance path 312 is provided in order to convey the sheet subjected to the fixing processing by the first fixing device 311 without passing the sheet through the second fixing device 313.

At a position after the conveyance path 314 and the conveyance path 312 merge, a conveyance path 315 and a reverse path 316 are provided. When double-sided printing is instructed, the sheet is conveyed to the reverse path 316. The sheet conveyed to the reverse path 316 is reversed in the reverse path 316 in terms of the conveying direction, and conveyed to a double-sided conveyance path 317. A surface (first surface) of the sheet on which an image has been formed is reversed by the reverse path 316 and the double-sided conveyance path 317. The sheet is conveyed to the conveyance path 303 by the double-sided conveyance path 317, and passes through the secondary transfer roller 309 and the fixing unit 229, to thereby have an image formed on a second surface of the sheet different from the first surface.

Figure 4:
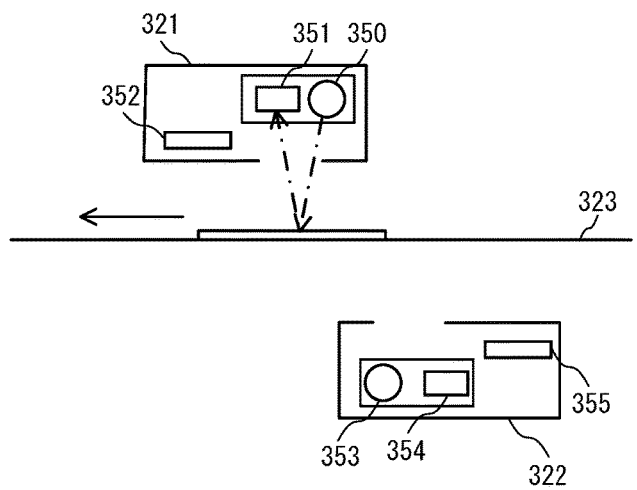
FIG. 4 is an explanatory view of CISs.

In a case of single-sided printing or when images are formed on both sides by double-sided printing, the sheet is conveyed to the conveyance path 315. A conveyance path 323 is arranged downstream of the conveyance path 315 in the sheet conveying direction. As the image reading unit 231, contact image sensors (CISs) 321 and 322 are arranged in the conveyance path 323 so as to be opposed to each other across the conveyance path 323. FIG. 4 is an explanatory view of the CISs 321 and 322. The CIS 321 is an optical sensor configured to read an image on an upper surface of the sheet being conveyed along the conveyance path 323. The CIS 322 is an optical sensor configured to read an image on a lower surface of the sheet being conveyed along the conveyance path 323.

The CIS 321 includes a light emitting diode (LED) 350 serving as a light source, a reading sensor 351 serving as a light receiver, and a white reference plate 352. The LED 350 is configured to irradiate the upper surface of the sheet with light at a timing at which the sheet conveyed along the conveyance path 323 reaches a reading position. The reading sensor 351 includes a plurality of light-receiving elements (photoelectric conversion elements) in a direction orthogonal to the sheet conveying direction. Therefore, the direction orthogonal to the sheet conveying direction is a main scanning direction of the CIS 321. The reading sensor 351 is configured to receive the light reflected by the sheet. The plurality of light-receiving elements of the reading sensor 351 each output an output value (electric signal) based on intensity of the reflected light that has been received. Each output value (electric signal) output from the plurality of light-receiving elements is transmitted to the CPU 222. In this manner, an image formed on the sheet is read.

The white reference plate 352 is a calibration member (reference member) used at a time of shading correction of the CIS 321. At the time of the shading correction, the LED 350 and the reading sensor 351 move to a position at which the white reference plate 352 can be read. In another case, at the time of the shading correction, the white reference plate 352 moves to a position at which the LED 350 and the reading sensor 351 perform the reading. The shading correction of the CIS 321 is performed based on a reading result of the white reference plate 352. Therefore, the CIS 321 cannot read an image formed on the sheet at the time of the shading correction.

In the same manner as the CIS 321, the CIS 322 includes an LED 353, a reading sensor 354, and a white reference plate 355. The CIS 322 is configured to operate in the same manner as the CIS 321 to read an image formed on the lower surface of the sheet at a timing at which the sheet conveyed along the conveyance path 323 reaches a reading position. In addition to the CISs 321 and 322, the image reading unit 231 can also be implemented by a CCD or CMOS sensor.

The printing apparatus 107 in this embodiment can form images for adjustment for adjusting the image forming conditions on both sides of the sheet. A sheet having the images for adjustment formed thereon is referred to as "chart for adjustment." The printing apparatus 107 prints the images for adjustment on a sheet to create a chart for adjustment, and causes the CIS 321 and the CIS 322 to read the images for adjustment. The images of the chart for adjustment, which have been read by the CIS 321 and the CIS 322, are stored in the memory 223. The CPU 222 refers to the memory 223 to analyze the images read by the CIS 321 and the CIS 322, and provide feedback to the image forming conditions to adjust the image forming conditions.

For example, when a temperature in the printing apparatus 107 rises, the geometric characteristics of the image formed on the sheet vary more greatly than when the in-machine temperature of the printing apparatus 107 is lower. The printing apparatus 107 creates a chart for adjustment, and detects the geometric characteristics based on the reading results obtained by the CISs 321 and 322. The CPU 222 performs affine transformation on the image data so that the detected geometric characteristics become ideal geometric characteristics. The printing apparatus 107 can control the geometric characteristics of the image formed on the sheet by forming an image on the sheet based on the image data converted by the CPU 222. Thus, the printing apparatus 107 can suppress fluctuations in the geometric characteristics of the image caused by fluctuations in the temperature in the image forming apparatus 101.

The image for adjustment to be formed on the chart for adjustment may be not only an image for detecting a geometric characteristic but also an image for detecting an image density or an image for detecting color misregistration. When the image for adjustment for detecting the image density is formed, the CPU 222 generates an image forming condition for suppressing the variations in the image density based on the reading result obtained by the CIS 321 (or the CIS 322). The CPU 222 controls the intensity of the light source of the exposure unit 227 based on the image forming condition, to thereby adjust the image density of the printing apparatus 107 to an ideal image density. In another case, the CPU 222 generates a one-dimensional tone correction table for suppressing the variations in the image density based on the reading result obtained by the CIS 321 (or the CIS 322). The CPU 222 converts the image data based on the tone correction table. The printing apparatus 107 forms an image on the sheet based on the image data converted by the CPU 222, to thereby adjust the image density of the printing apparatus 107 to an ideal image density.

Further, when an image for adjustment for detecting the color misregistration is formed, the CPU 222 detects the color misregistration based on the reading result obtained by the CIS 321 (or the CIS 322). The CPU 222 controls, based on the detected color misregistration, a position of an image to be formed on each photoconductor by the exposure unit 227, to thereby correct the color misregistration.

The image for adjustment may be in any one of a format printed as the chart for adjustment on a sheet different from a sheet having a user image printed thereon and a format printed on the same sheet as the sheet having the user image printed thereon. When the image for adjustment is to be printed as the chart for adjustment, the CPU 222 creates, from the received image data, image data in which the chart for adjustment is inserted between a user image of the N-th page and a user image of the (N+1)th page each time the number of printed sheets reaches a predetermined number N. When the image for adjustment is to be formed on the same sheet as the sheet having the user image printed thereon, it is preferred that the image for adjustment be formed in a cut-off area of the sheet. This is because the image for adjustment is to be removed from the printed product after cut-off processing is performed. In this case, the user image refers to an image included in the image data transferred from the client PC 103.

The chart for adjustment is excluded so as to avoid being mixed in the printed products corresponding to the print job. To that end, the printing apparatus 107 includes a flapper 324, a discharge path 326, a conveyance sensor 327, and a discharge tray 328. The chart for adjustment having the images (images for adjustment) read by the CISs 321 and 322 is conveyed to the discharge path 326 by the flapper 324. The sheet conveyed to the discharge path 326 is delivered to the discharge tray 328.

When the sheet is not a chart for adjustment, the sheet is conveyed from the conveyance path 323 to a downstream conveyance path 325 by the flapper 324. The sheet conveyed to the downstream conveyance path 325 is passed over to the finisher 109. When the printing apparatus 107 obtains a notification of occurrence of a conveyance jam from the finisher 109, irrespective of whether or not the sheet is a chart for adjustment, the printing apparatus 107 switches the flapper 324 toward the discharge path 326 to deliver all the sheets in the machine (residual sheets) to the discharge tray 328. The delivery of the residual sheets to the discharge tray 328 reduces a load on the user in jam clearance.

The finisher 109 can stack the sheets passed over from the printing apparatus 107. The finisher 109 includes a conveyance path 331 and a stack tray 332 for stacking the sheets. The conveyance path 331 is provided with conveyance sensors 333, 334, 335, and 336. The sheets conveyed from the printing apparatus 107 are stacked on the stack tray 332 through the conveyance path 331. The conveyance sensors 333, 334, 335, and 336 are each configured to detect passage of the sheet being conveyed along the conveyance path 331. When a leading edge or a trailing edge of the sheet in the conveying direction is not detected by the conveyance sensors 333, 334, 335, and 336 even after a lapse of a predetermined time period since start of the conveyance of the sheet, the CPU 242 determines that a conveyance jam (conveyance abnormality) has occurred in the finisher 109. In this case, the CPU 242 notifies the printing apparatus 107 that a conveyance jam has occurred.

<Method of Setting Front-and-Back Auto Adjustment>

The image forming apparatus 101 according to this embodiment is capable of setting front-and-back auto adjustment for automatically adjusting the correction values for the image forming conditions (geometric characteristics) during printing. FIG. 5A to FIG. 5F are explanatory views of a setting screen for setting the front-and-back auto adjustment. The setting screen is displayed on the display 225 by the CPU 222. The user can set the front-and-back auto adjustment from the setting screen through the operation unit 224. The user sets the front-and-back auto adjustment before instructing execution of printing.

Figure 5A:
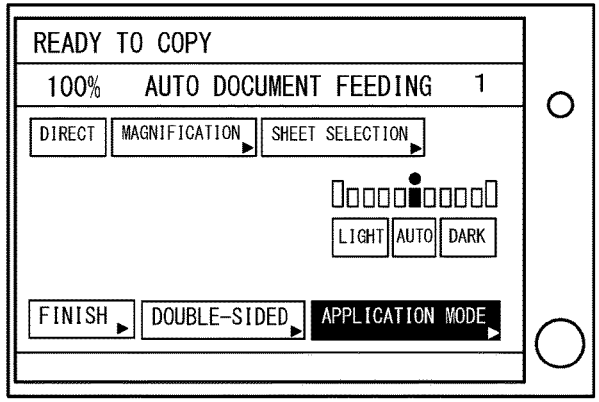
FIG. 5A, FIG. 5B, FIG. 5C, FIG. 5D, FIG. 5E, and FIG. 5F are explanatory views of a setting screen.
Figure 5B:
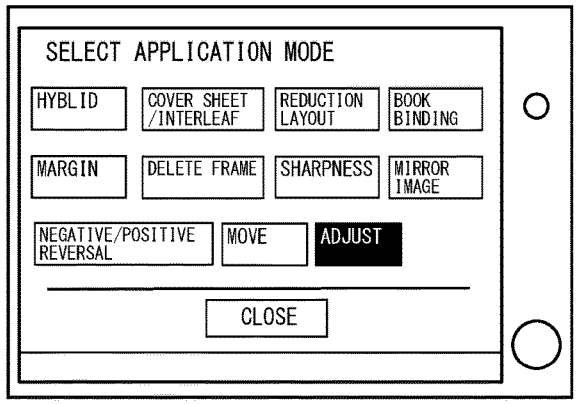

FIG. 5A is an illustration of an initial screen. When the user selects a soft key labeled "APPLICATION MODE" from the initial screen, the CPU 222 displays an advanced mode selection screen of FIG. 5B on the display 225. When the user selects a soft key labeled "ADJUST" from the advanced mode selection screen, the CPU 222 displays a front-and-back auto adjustment setting screen of FIG. 5C on the display 225. When the user selects a soft key labeled "ENABLE" from the front-and-back auto adjustment setting screen, the CPU 222 displays an adjustment frequency selection screen of FIG. 5D on the display 225.

Figure 10:
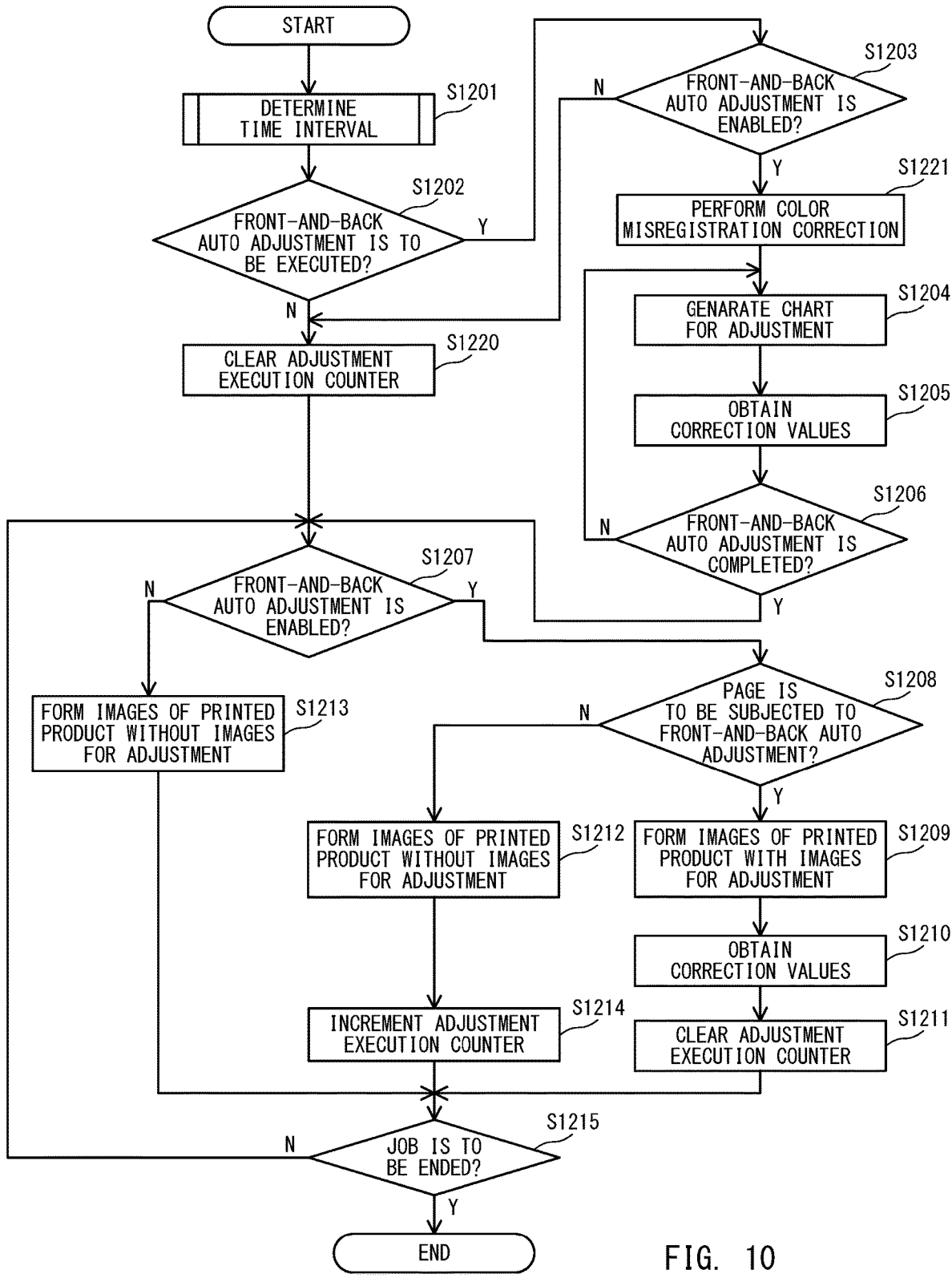
FIG. 10 is a flow chart for illustrating image forming processing.

When the user selects a soft key labeled "REAL TIME" from the adjustment frequency selection screen, the CPU 222 sets an operation mode for forming the images for adjustment on all pages. When the user selects a soft key labeled "ADJUSTMENT INTERVAL" from the adjustment frequency selection screen, the CPU 222 displays an adjustment interval setting screen of FIG. 5E on the display 225. When the user presses a soft key labeled "OK" after inputting the number of sheets by a numeric keypad on the adjustment interval setting screen, the front-and-back auto adjustment is enabled. In the example of FIG. 5E, 10 sheets are set as the number of sheets of an adjustment interval. A chart for adjustment is created every number of sheets set as the adjustment interval. That is, the front-and-back auto adjustment is performed by the chart for adjustment every number of sheets set as the adjustment interval, to thereby adjust the image forming conditions (geometric characteristics). When the user selects a soft key labeled "DISABLE" from the front-and-back auto adjustment setting screen of FIG. 5C, the front-and-back auto adjustment is disabled.

When the front-and-back auto adjustment is set, the CPU 222 displays the initial screen on the display 225. FIG. 5F is an illustration of the display 225 on which the initial screen is displayed, which includes a print button 601 and an interrupt button 602. When the user presses the print button 601, the CPU 222 executes printing. When the front-and-back auto adjustment is enabled, the CPU 222 creates a chart for adjustment every number of sheets set as the adjustment interval. When the front-and-back auto adjustment is disabled, the front-and-back auto adjustment is not to be performed.

Even in a case of an interrupt print job being interrupt processing, the front-and-back auto adjustment can be set. When the user presses the interrupt button 602 during printing, the interrupt print job is set. After the user presses the interrupt button 602, the user enables the front-and-back auto adjustment, sets the adjustment interval to a predetermined number of sheets (for example, 5 sheets), and presses the print button 601. Thus, a chart for adjustment is created every 5 sheets during printing based on the interrupt print job.

Figure 5C:
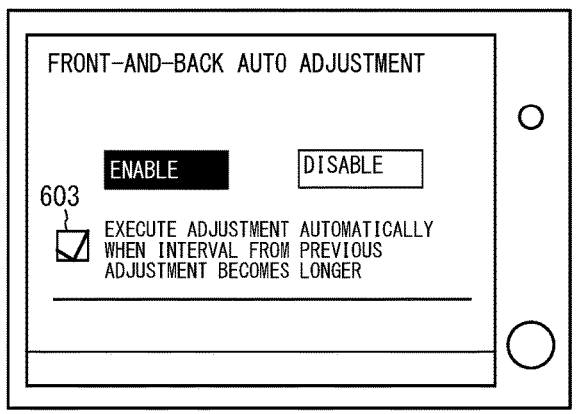
Figure 5D:
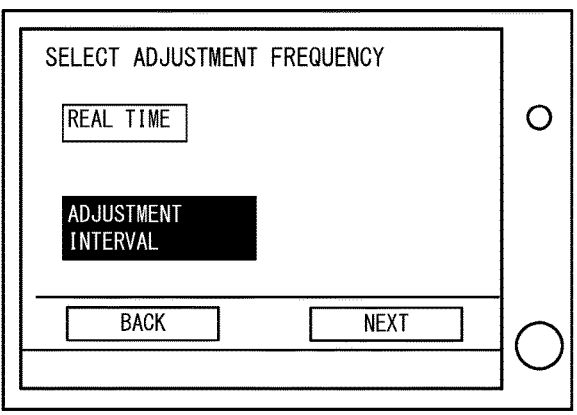
Figure 5E:
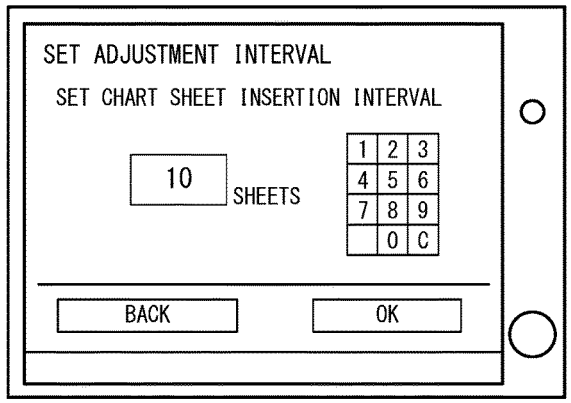
Figure 5F:
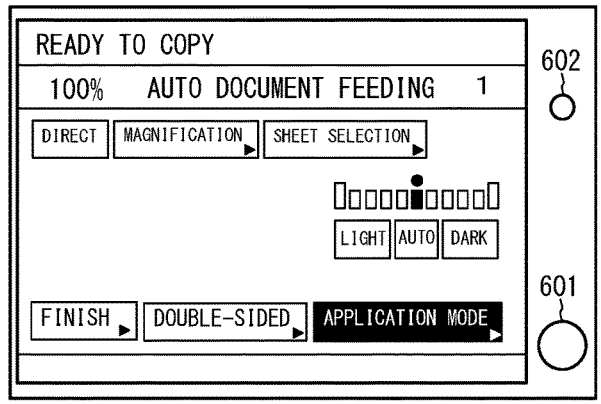

When a job is instructed with a checkbox 603 of FIG. 5C being checked, the front-and-back auto adjustment using the chart for adjustment is executed based on the elapsed time since the previous front-and-back auto adjustment. For example, when a predetermined time period or more has elapsed since the previous front-and-back auto adjustment, the front-and-back auto adjustment is executed. Details of the front-and-back auto adjustment are described later. When a job is instructed with the checkbox 603 being unchecked, the front-and-back auto adjustment using the chart for adjustment is not executed even when a predetermined time period or more has elapsed since the previous front-and-back auto adjustment. In this embodiment, it is set whether or not to perform such front-and-back auto adjustment uniformly for the job, but this setting may be changed for each type of sheet feeding deck or sheet. For example, in a sheet feeding deck storing an expensive sheet, front-and-back auto adjustment using the chart for adjustment can be set so as not to be performed.

<Information at Time of Execution of Print Job>

Figure 6:
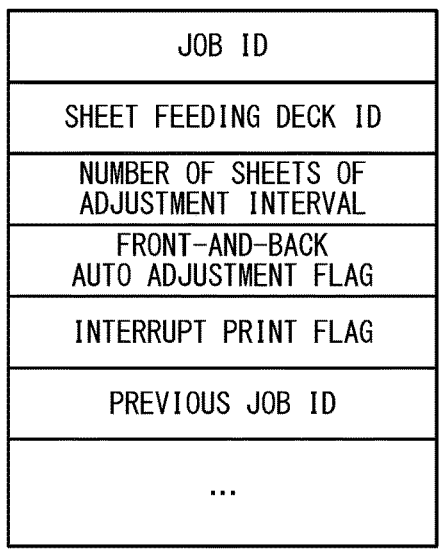
FIG. 6 is an exemplary diagram of job information.

FIG. 6 is an exemplary diagram of job information to be stored in the memory 223 at a time of execution of a print job. The job information is stored in the memory 223 by the CPU 222 in response to input of a print job or an interrupt print job.

The job information is managed by job IDs. The job information includes a sheet feeding deck ID, the number of sheets of the adjustment interval, a front-and-back auto adjustment flag, an interrupt print flag, and the previous job ID. The sheet feeding deck ID indicates a sheet feeding deck to be used for feeding sheets in the print job. The number of sheets of the adjustment interval is the number of sheets set on the adjustment interval setting screen. The front-and-back auto adjustment flag indicates a setting status (enabled or disabled) of the front-and-back auto adjustment. For example, when the front-and-back auto adjustment is enabled, the front-and-back auto adjustment flag is set to "1," and when the front-and-back auto adjustment is disabled, the front-and-back auto adjustment flag is set to "0." The interrupt print flag indicates whether or not the job is an interrupt print job. For example, when the job is an interrupt print job, the interrupt print flag is set to "1," and when the job is not an interrupt print job, the interrupt print flag is set to "0." The previous job ID is, assuming that the job is an interrupt print job, a job ID of an interrupted print job.

Figure 7:
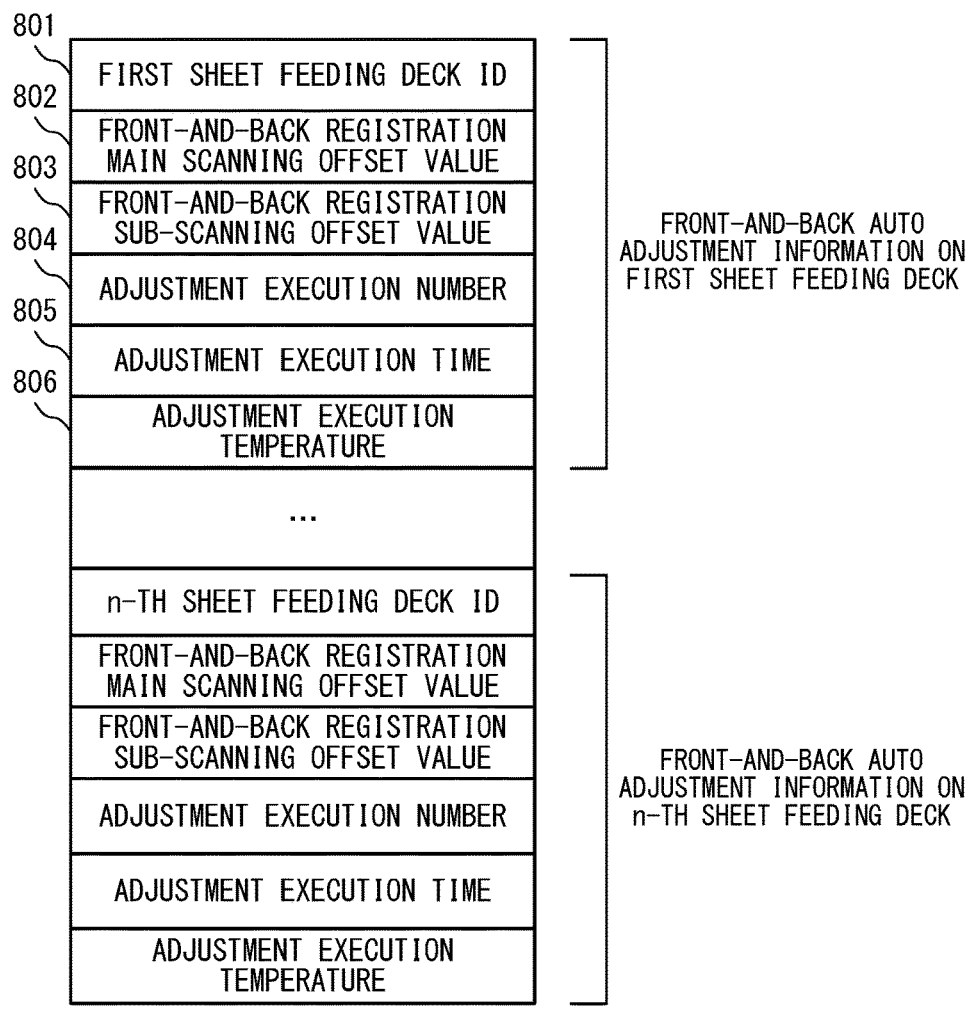
FIG. 7 is an exemplary diagram of front-and-back auto adjustment information.

The correction values for the geometric characteristics to be adjusted by the front-and-back auto adjustment are set for each sheet feeding deck. The correction values for the geometric characteristics for each sheet feeding deck are stored in the memory 223 as, for example, front-and-back auto adjustment information. FIG. 7 is an exemplary diagram of the front-and-back auto adjustment information.

The front-and-back auto adjustment information is identified based on the sheet feeding deck ID (first sheet feeding deck ID 801) as to which sheet feeding deck relates to the front-and-back auto adjustment information. The front-and-back auto adjustment information includes a front-and-back registration adjustment value (correction value) for each sheet feeding deck. The front-and-back registration adjustment value is a value for adjusting (offsetting) a writing start position of each of the images on the front and back sides. The CPU 222 reads out the front-and-back auto adjustment information at a timing of starting printing processing. For example, in a case of a print job in which a sheet is fed from the sheet feeding deck 301 (first sheet feeding deck), the CPU 222 reads out a front-and-back registration main scanning offset value 802 and a front-and-back registration sub-scanning offset value 803 of the first sheet feeding deck ID 801, and offsets the writing start position of the image. The front-and-back registration main scanning offset value 802 and the front-and-back registration sub-scanning offset value 803 are updated based on the reading results of the images for adjustment.

The CPU 222 counts a cumulative number of printed sheets of the printing apparatus 107. As an adjustment execution number 804, a cumulative number of printed sheets at a time point at which the front-and-back auto adjustment is executed is held. As an adjustment execution time 805, a time obtained from the timer 251 by the CPU 222 at the time point at which the front-and-back auto adjustment is executed is held. As an adjustment execution temperature 806, an in-machine temperature obtained by the CPU 222 from the temperature sensor 252 at the time point at which the front-and-back auto adjustment is executed is held. When the checkbox 603 of FIG. 5C is checked and whether or not to perform the front-and-back auto adjustment is set for each sheet feeding deck, the setting information is held in the memory 223 in the same manner.

<Images for Adjustment>

Figure 8:
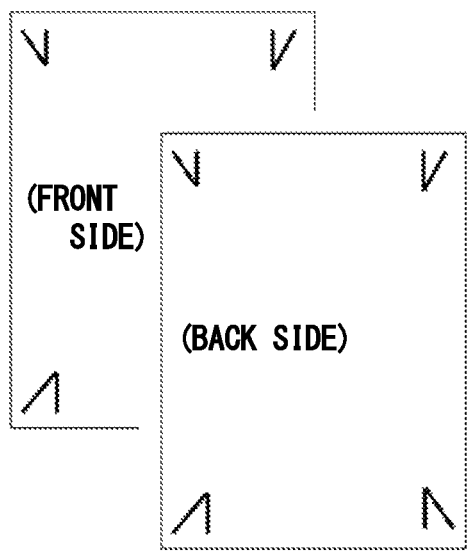
FIG. 8 is an exemplary view of a chart for adjustment.

FIG. 8 is an exemplary view of the chart for adjustment. When the front-and-back auto adjustment is set enabled, images for adjustment are printed on a sheet to create a chart for adjustment every number of sheets set as the adjustment interval. In the chart for adjustment, the images for adjustment on the front side are read by the CIS 321, and the images for adjustment on the back side are read by the CIS 322. The CPU 222 calculates deviation amounts of the images for adjustment from reference positions based on the reading results of the images for adjustment, which are obtained by the CISs 321 and 322, to determine correction values in the main scanning direction and a sub-scanning direction (front-and-back registration main scanning offset value and front-and-back registration sub-scanning offset value). The CPU 222 updates automatic adjustment information stored in the memory 223 based on the determined correction values. For example, when a sheet is fed from the sheet feeding deck 301, the CPU 222 updates the front-and-back registration main scanning offset value 802 and the front-and-back registration sub-scanning offset value 803 based on the determined correction values.

The images for adjustment, which are formed together with the user images, are also the images for adjustment illustrated in FIG. 8. The images for adjustment are formed at the four corners of each user image. In the same manner as the chart for adjustment, for the images for adjustment, which are formed together with the user images, the correction values are determined based on the reading results obtained by the CISs 321 and 322.

<Front-and-Back Auto Adjustment>

Figure 9A:
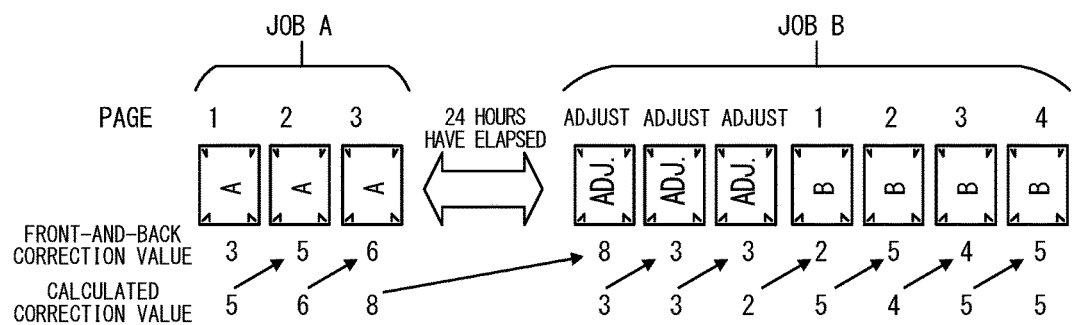
FIG. 9A, FIG. 9B, and FIG. 9C are explanatory views of front-and-back auto adjustment using the chart for adjustment.
Figure 9B:
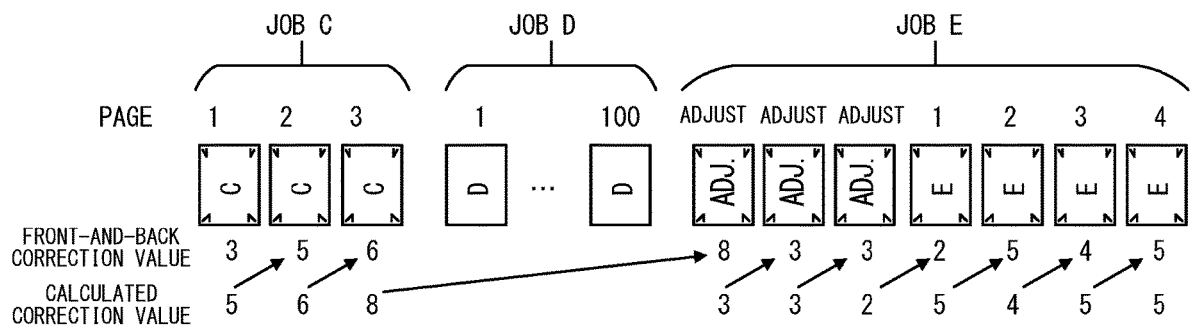
Figure 9C:
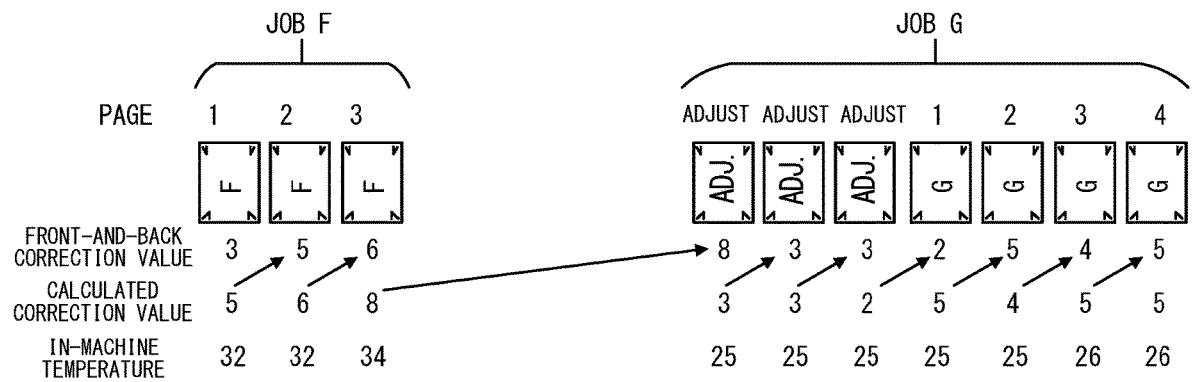

FIG. 9A to FIG. 9C are explanatory views of the front-and-back auto adjustment using the chart for adjustment, which is performed when an execution interval of the front-and-back auto adjustment becomes longer. As described above, optimum image forming conditions change depending on changes in the environmental conditions of the printing apparatus 107 and the sheet conditions of the sheet to be printed. Therefore, when the subsequent printing operation is performed after a lapse of a predetermined time interval since the previous front-and-back auto adjustment is performed, printing with the optimum geometric characteristics may fail through use of the correction values at a time of the previous front-and-back auto adjustment. In this embodiment, when a job is started after a lapse of a predetermined time period or more since the previous front-and-back auto adjustment, printing corresponding to the print job is performed after the front-and-back auto adjustment is executed through use of the chart for adjustment, to thereby generate a printed product through use of optimum correction values. In the following description, three charts for adjustment are inserted between print jobs before performing the subsequent print job, but any number of charts for adjustment may be inserted as long as the correction values obtained as a result of the front-and-back auto adjustment using the chart for adjustment are reflected in the printed product.

FIG. 9A is an explanatory view of a case in which printing of a job B having the front-and-back auto adjustment set enabled is executed after a lapse of one day since printing of a job A having the front-and-back auto adjustment set enabled is executed. A time interval from the printing of the third page of the job A to start of the job B is 24 hours, and it is determined that the predetermined time interval or more has elapsed. Therefore, the charts for adjustment ("ADJ." in FIG. 9A) are inserted before the first page of the job B, and then the printing of the first page of the job B is executed. A criterion for determining whether or not to perform the front-and-back auto adjustment through use of the chart for adjustment in this case is determined depending on the configuration of the printing apparatus 107. In this embodiment, when a time interval of one hour or more has elapsed, it is determined that the predetermined time interval or more has elapsed. As described with reference to FIG. 7, the memory 223 stores the time obtained from the timer 251 by the CPU 222 during the front-and-back auto adjustment. This time is used to obtain a difference from a time of the execution of the job B, and the CPU 222 determines from the difference whether or not the predetermined time interval or more has elapsed.

A front-and-back correction value of "3" for the first page of the job A is a correction value to be used when the image formation of the first page of the job A is performed. A calculated correction value of "5" for the first page of the job A is a correction value for the subsequent page, which is determined by calculating the deviation amount from the reading results of the images for adjustment for the first page of the job A. The calculated correction value of "5" is set as a front-and-back correction value of "5" for the second page of the job A being the subsequent page. When no chart for adjustment is inserted, a calculated correction value of "8" determined from the deviation amount based on the images for adjustment for the third page of the job A is used as a front-and-back correction value for the first page of the job B. However, due to the longer time interval of the front-and-back auto adjustment, printing with the optimum geometric characteristics may fail through use of this front-and-back correction value. Therefore, the correction value is calculated through use of the chart for adjustment before start of printing of the first sheet of the job B. In this case, a calculated correction value of "2" obtained by calculating the deviation amount through use of the chart for adjustment is used as a front-and-back correction value for the first page of the job B. Through use of such a correction value, the printing with the optimum geometric characteristics is performed to obtain a printed product.

FIG. 9B is an explanatory view of a case in which printing of a job D having the front-and-back auto adjustment set disabled is executed after printing of a job C having the front-and-back auto adjustment set enabled is executed, and then a job E having the front-and-back auto adjustment set enabled is executed. In the job D, printing is performed on 100 sheets. The printing is performed on 100 sheets from the third page of the job C to start of the job E, and it is determined that the predetermined time interval or more has elapsed. Therefore, printing of the first page of the job E is executed after the front-and-back auto adjustment using the chart for adjustment is performed. A criterion for determining whether or not to perform the front-and-back auto adjustment through use of the chart for adjustment in this case is determined depending on the configuration of the printing apparatus 107. In this embodiment, when such a time interval as to print 100 or more sheets has elapsed, it is determined that the predetermined time interval or more has elapsed.

As described with reference to FIG. 7, the memory 223 stores the cumulative number of printed sheets at a time of execution of the front-and-back auto adjustment. This cumulative number of printed sheets is used to calculate the number of sheets printed without the execution of the front-and-back auto adjustment from a difference from the cumulative number of printed sheets at the start of the job E. It is determined based on this number of sheets whether or not the predetermined time interval or more has elapsed. In this case, in the same manner as described with reference to FIG. 9A, the calculated correction value of "2" obtained from the deviation amount calculated through use of the chart for adjustment ("ADJ." in FIG. 9B) is used as the front-and-back correction value for the first page of the job E. Through use of such a correction value, the printing with the optimum geometric characteristics is performed to obtain a printed product.

FIG. 9C is an explanatory view of a case in which it is determined whether or not the front-and-back auto adjustment using the chart for adjustment can be executed based on the change in the in-machine temperature. In this case, it is determined whether or not the front-and-back auto adjustment using the chart for adjustment can be executed based on a difference between an in-machine temperature at a time of printing of the final page of a job F having the front-and-back auto adjustment set enabled and an in-machine temperature at a time of execution of a job G having the front-and-back auto adjustment set enabled. When the difference in the in-machine temperature is equal to or more than a predetermined temperature, it is determined that the predetermined time interval or more has elapsed between the jobs.

In FIG. 9C, the in-machine temperature at the time of the printing of the final page of the job F is 34° C., and meanwhile, the in-machine temperature at the time of the execution of the job G is 25° C. In this case, it is determined that the predetermined time interval or more has elapsed as the interval between the jobs while the in-machine temperature decreases by 9° C., and the front-and-back auto adjustment based on the chart for adjustment is performed before start of the printing of the first page of the job G. A criterion for determining whether or not to perform the front-and-back auto adjustment through use of the chart for adjustment in this case is determined depending on the configuration of the printing apparatus 107. In this embodiment, when such a time interval as to cause a change in temperature of 5° C. or more has elapsed, it is determined that the predetermined time interval or more has elapsed.

As described with reference to FIG. 7, the memory 223 stores the in-machine temperature at the time of the execution of the front-and-back auto adjustment. This in-machine temperature is used to determine whether or not the predetermined time interval or more has elapsed from a difference from the in-machine temperature at the time of the execution of the job G. In this case, in the same manner as described with reference to FIG. 9A, the calculated correction value of "2" obtained from the deviation amount calculated through use of the chart for adjustment ("ADJ." in FIG. 9C) is used as the front-and-back correction value for the first page of the job G. Through use of such a correction value, the printing with the optimum geometric characteristics is performed to obtain a printed product.

In this embodiment, for each sheet feeding deck, the memory 223 holds: the correction values; and the execution time, the cumulative number of printed sheets, and the in-machine temperature at the time of the execution of the last adjustment. The time interval from the previous front-and-back auto adjustment is determined for each sheet feeding deck. When the correction values do not depend on the sheet feeding deck, the time interval may be determined in common for each sheet feeding deck. When a plurality of sheet feeding decks have a dependence relationship with one another, the time interval may be determined in consideration of the dependence relationship.

In this embodiment, an example in which the sheet feeding deck can be set for each print job is described, and it is determined whether or not to insert the charts for adjustment at the beginning of the job. When the correction value is different for each sheet feeding deck, it may be determined whether or not to insert the charts for adjustment every time the sheet feeding deck of the sheet to be printed is switched.

The same determination can be performed for an interrupt job. For example, when a job A' of performing printing for 24 hours with the front-and-back auto adjustment being set disabled interrupts the job A of FIG. 9A, 24 hours have elapsed at a timing of restart of the job A. Therefore, the job A is restarted after the front-and-back auto adjustment based on the chart for adjustment is performed. In the same manner in FIG. 9B, when a job C' of printing 100 sheets with the front-and-back auto adjustment being set disabled interrupts the job C, the time period used for printing 100 sheets has elapsed at a timing of restart of the job C. Therefore, the job C is restarted after the front-and-back auto adjustment based on the chart for adjustment is performed. In the same manner in FIG. 9C, when a job F' of performing long-time printing with the front-and-back auto adjustment being set disabled interrupts the job F, the time period used for changing the in-machine temperature by the predetermined temperature or more has elapsed at a timing of restart of the job F. Therefore, the job F is restarted after the front-and-back auto adjustment based on the chart for adjustment is performed. When the checkbox 603 of FIG. 5C is unchecked, the front-and-back auto adjustment using the chart for adjustment is not executed even when the predetermined time period or more has elapsed as the time interval from the previous front-and-back auto adjustment.

<Image Forming Processing Involving Front-and-Back Auto Adjustment>

FIG. 10 is a flow chart for illustrating the image forming processing in this embodiment. The image forming processing is started when the printing apparatus 107 receives a print job start instruction from the operation unit 224 or the client PC 103.

When the CPU 222 receives the print job start instruction, the CPU 222 first performs processing for determining a time interval after the end of the previous front-and-back auto adjustment (Step S1201). Through the processing for determining the time interval, the CPU 222 determines whether or not it is required to perform the front-and-back auto adjustment based on the chart for adjustment before the execution of the job. The processing of Step S1201 is also performed when the received print job is an interrupt job. When it is required to perform the front-and-back auto adjustment based on the chart for adjustment (Y in Step S1202), the CPU 222 determines whether or not the front-and-back auto adjustment is set enabled for the currently received print job (Step S1203).

When the front-and-back auto adjustment is set enabled (Y in Step S1203), the CPU 222 executes the front-and-back auto adjustment. The CPU 222 first corrects the relative printing positions of the respective colors before starting the printing based on the print job. Therefore, the CPU 222 performs known color misregistration correction (Step S1221). Thus, the color misregistration among the respective colors of yellow (Y), magenta (M), cyan (C), and black (K) is corrected. When the color misregistration correction is ended, the CPU 222 generates a chart for adjustment (Step S1204). The CPU 222 performs the front-and-back auto adjustment based on the generated chart for adjustment, calculates the deviation amounts from the image forming positions based on the reading results of the images for adjustment, and obtains correction values corresponding to the deviation amounts (Step S1205). The correction values are stored in the memory 223 as the correction values for the sheet feeding deck in which the sheets used for the job are stored. The CPU 222 simultaneously updates the values stored in the memory 223, which include the cumulative number of printed sheets at the time of the execution of the adjustment. The CPU 222 repeatedly performs the front-and-back auto adjustment using the chart for adjustment until the adjustment of the correction values based on the charts for adjustment is completed (N in Step S1206). In this embodiment, as described with reference to FIG. 9A to FIG. 9C, the front-and-back auto adjustment using three charts for adjustment is performed. That is, the processing of Step S1204 and Step S1205 is repeated three times.

When it is not required to perform the front-and-back auto adjustment based on the chart for adjustment (N in Step S1202), or when the print job has the front-and-back auto adjustment set disabled (N in Step S1203), the CPU 222 does not perform the front-and-back auto adjustment based on the chart for adjustment. In this case, the CPU 222 clears an adjustment execution counter (Step S1220), and starts the printing based on the print job. The adjustment execution counter represents the number of printed products continuously generated without performing the front-and-back auto adjustment. In a character mode in which only characters are printed or in an office document mode in which an image is not formed on the entire surface of the sheet, the deviation of the printing positions on the front and back sides does not cause a problem. In such a job mode, the CPU 222 may determine that the chart for adjustment is not to be inserted before the execution of the job in the processing of Step S1201.

The CPU 222 that has started the printing determines whether or not the job has the front-and-back auto adjustment set enabled (Step S1207). When the front-and-back auto adjustment is set enabled (Y in Step S1207), the CPU 222 determines whether or not the page to be formed is a page to be subjected to the front-and-back auto adjustment (Step S1208). When the adjustment frequency is set to "REAL TIME" on the adjustment frequency selection screen of FIG. 5D, all the pages are pages to be subjected to the front-and-back auto adjustment. When "ADJUSTMENT INTERVAL" is set on the adjustment frequency selection screen, the CPU 222 performs comparison between the number of sheets set on the adjustment interval setting screen of FIG. 5E and the adjustment execution counter stored in the memory 223. As a result of the comparison, when the adjustment execution counter is larger, the CPU 222 determines that the page is a page to be subjected to the front-and-back auto adjustment.

When the page is a page to be subjected to the front-and-back auto adjustment (Y in Step S1208), the CPU 222 forms images of a printed product obtained by adding the images for adjustment to the user image (Step S1209). The CPU 222 calculates the deviation amounts of the image forming positions based on the reading results of the images for adjustment formed on the printed product, and obtains the correction values corresponding to the deviation amounts (Step S1210). The correction values are stored in the memory 223 as the correction values for the sheet feeding deck in which the sheets used for the job are stored. After that, the CPU 222 clears the adjustment execution counter (Step S1211).

The CPU 222 that has cleared the adjustment execution counter determines whether or not the printing up to the final page of the print job has been ended and the print job is to be ended (Step S1215). When the print job is not to be ended (N in Step S1215), the CPU 222 repeatedly performs the processing of Step S1207 and the subsequent steps. When the print job is to be ended (Y in Step S1215), the CPU 222 ends the image forming processing corresponding to the print job.

When the page is not a page to be subjected to the front-and-back auto adjustment (N in Step S1208), the CPU 222 forms images of a printed product without the addition of the images for adjustment thereto (Step S1212). The CPU 222 increments the adjustment execution counter (Step S1214). The CPU 222 that has incremented the adjustment execution counter determines whether or not the printing up to the final page of the print job has been ended and the print job is to be ended (Step S1215). When the print job is not to be ended (N in Step S1215), the CPU 222 repeatedly performs the processing of Step S1207 and the subsequent steps. When the print job is to be ended (Y in Step S1215), the CPU 222 ends the image forming processing corresponding to the print job.

When the front-and-back auto adjustment is set disabled (N in Step S1207), the CPU 222 forms images of a printed product without the addition of the images for adjustment thereto (Step S1213). The CPU 222 that has output the printed product determines whether or not the printing up to the final page of the print job has been ended and the print job is to be ended (Step S1215). When the print job is not to be ended (N in Step S1215), the CPU 222 repeatedly performs the processing of Step S1207 and the subsequent steps. When the print job is to be ended (Y in Step S1215), the CPU 222 ends the image forming processing corresponding to the print job.

As described with reference to FIG. 9A to FIG. 9C, when the interrupted job is restarted after the interrupt job is completed, the CPU 222 may perform determination equivalent to Step S1201 to perform the front-and-back auto adjustment using the chart for adjustment.

Figure 11:
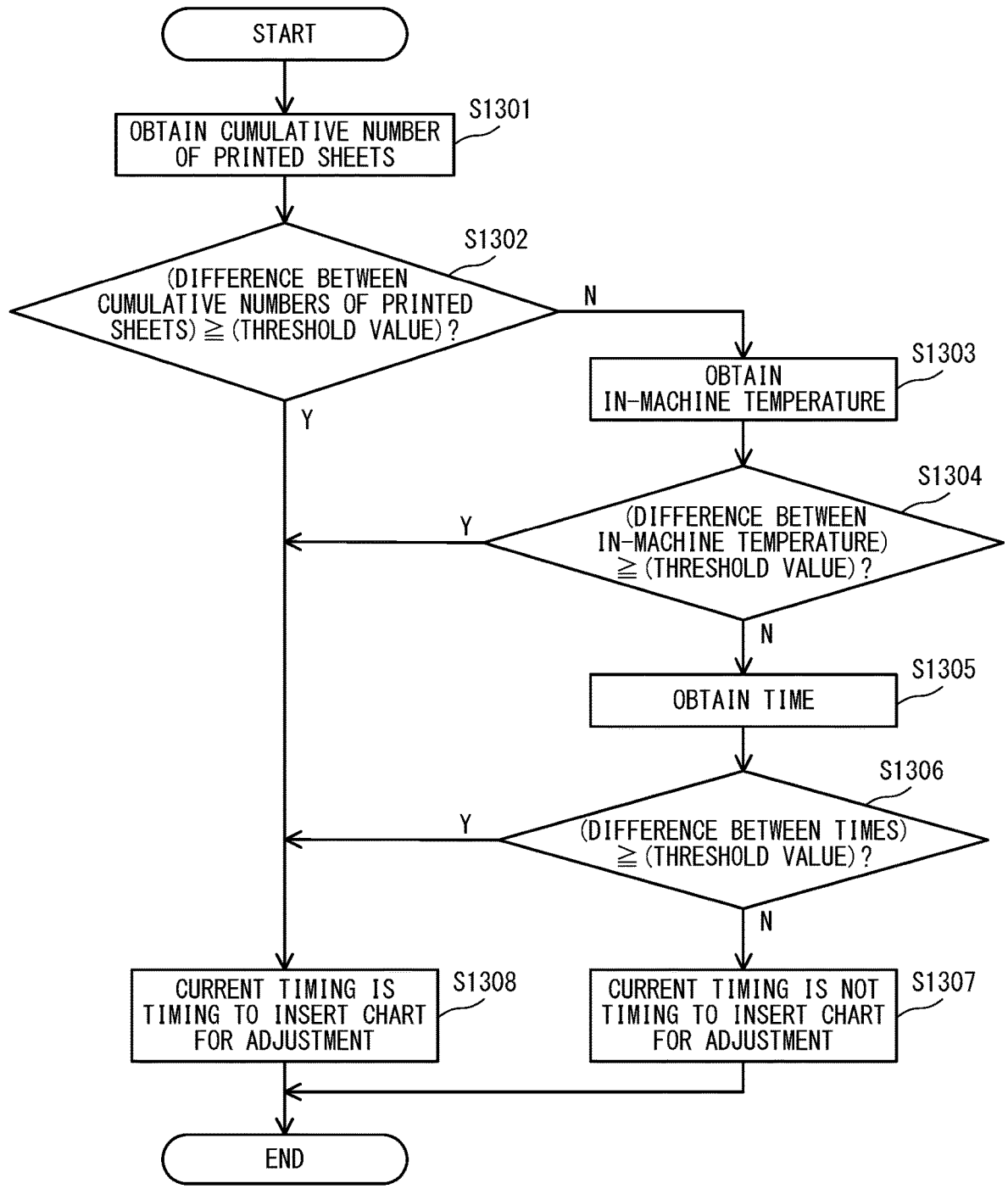
FIG. 11 is a flow chart for illustrating the processing of Step S1201.

FIG. 11 is a flow chart for illustrating the processing of Step S1201 for determining the time interval after the end of the previous front-and-back auto adjustment.

As described with reference to FIG. 9B, the CPU 222 obtains the cumulative number of printed sheets at the time of the end of the previous front-and-back auto adjustment, which is stored in the memory 223, and the current cumulative number of printed sheets (Step S1301). The CPU 222 determines whether or not a difference between the cumulative number of printed sheets at the time of the previous front-and-back auto adjustment and the current cumulative number of printed sheets is equal to or more than a predetermined threshold value (equal to or more than a predetermined number of sheets) (Step S1302). Thus, the CPU 222 determines from the difference between the cumulative number of printed sheets at the time of the previous front-and-back auto adjustment and the current cumulative number of printed sheets whether or not the predetermined time interval or more has elapsed since the time of the previous front-and-back auto adjustment.

When the difference is equal to or more than the predetermined threshold value (Y in Step S1302), the CPU 222 determines that the predetermined time interval or more has elapsed since the time of the previous front-and-back auto adjustment. In this case, the CPU 222 determines that the current timing is a timing to insert the chart for adjustment before the execution of the print job and update the correction values by the front-and-back auto adjustment (Step S1308).

When the difference is not equal to or more than the predetermined threshold value (N in Step S1302), the CPU 222 obtains the in-machine temperature at the time of the previous front-and-back auto adjustment, which is stored in the memory 223, and obtains the current in-machine temperature from the temperature sensor 252 (Step S1303). The CPU 222 determines whether or not a difference between the in-machine temperature at the time of the previous front-and-back auto adjustment and the current in-machine temperature is equal to or more than the predetermined threshold value (equal to or more than the predetermined temperature) (Step S1304). Thus, the CPU 222 determines from the difference between the in-machine temperature at the time of the previous front-and-back auto adjustment and the current in-machine temperature whether or not the predetermined time interval or more has elapsed since the time of the previous front-and-back auto adjustment.

When the difference is equal to or more than the predetermined threshold value (Y in Step S1304), the CPU 222 determines that the predetermined time interval or more has elapsed since the time of the previous front-and-back auto adjustment. In this case, the CPU 222 determines that the current timing is the timing to insert the chart for adjustment before the execution of the print job and update the adjustment correction values by the front-and-back auto adjustment (Step S1308).

When the difference is not equal to or more than the predetermined threshold value (N in Step S1304), the CPU 222 obtains the time of the end of the previous front-and-back auto adjustment, which is stored in the memory 223, and obtains the current time from the timer 251 (Step S1305). The CPU 222 determines whether or not a difference between the time of the end of the previous front-and-back auto adjustment and the current time is equal to or more than the predetermined threshold value (equal to or more than the predetermined time period) (Step S1306). Thus, the CPU 222 determines whether or not the predetermined time interval or more has elapsed since the time of the previous front-and-back auto adjustment.

When the difference is equal to or more than the predetermined threshold value (Y in Step S1306), the CPU 222 determines that the predetermined time interval or more has elapsed since the time of the previous front-and-back auto adjustment. In this case, the CPU 222 determines that the current timing is the timing to insert the chart for adjustment before the execution of the print job and update the adjustment correction values by the front-and-back auto adjustment (Step S1308). When the difference is not equal to or more than the predetermined threshold value (N in Step S1306), the CPU 222 determines that the current timing is not the timing to insert the chart for adjustment before the execution of the print job and update the adjustment correction values by the front-and-back auto adjustment (Step S1307).

As described above, the processing for determining the time interval after the end of the previous front-and-back auto adjustment is performed. After that, the CPU 222 performs the determination of Step S1202 based on a result of the processing for determining the time interval. In this embodiment, the cumulative number of printed sheets, the in-machine temperature, and the time interval are all used as the determination conditions, but at least any one of the conditions may be used to determine whether or not to perform the front-and-back auto adjustment based on the chart for adjustment before the execution of the job.

As described above, according to this embodiment, even when the time interval of the predetermined time period or more has elapsed since the previous front-and-back auto adjustment, it is possible to perform printing under optimum image forming conditions (correction values). Therefore, it is possible to perform the printing by optimally adjusting the correction values for the geometric characteristics of the front and back images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-115786, filed Jul. 3, 2020 and No. 2021-084003, filed May 18, 2021, which are hereby incorporated by reference herein in their entirety.

What is claimed is:

1. An image forming apparatus, comprising:
   an image former configured to form an image on a sheet based on an image forming condition for adjusting a position of the image on the sheet;
   a heater configured to fix the image on the sheet;
   an image reader configured to read the image on the sheet, the image reader being arranged downstream from the heater in a conveyance direction in which the sheet is conveyed; and
   a processor configured to:
   control the image former to form an image including a mark on a sheet;
   control the image reader to read the mark;
   generate the image forming condition based on a reading result of the mark by the image reader, and
   control to determine, in a case where a second image including the mark is formed by the image former after the first image including the mark is formed by the image former, whether to form a chart including the mark on the sheet before the second image is formed based on an elapsed time after forming the first image.

2. The image forming apparatus according to claim 1, wherein, in a case where the elapsed time is longer than a predetermined time, the processor is configured to form the chart.

3. The image forming apparatus according to claim 1, wherein, in a case where the elapsed time is shorter than a predetermined time, the processor is configured to not form the chart.

4. The image forming apparatus according to claim 1, wherein, in a case where the chart is formed before forming the second image, the processor is configured to create an image forming condition for the second image based on a reading result of the mark of the chart by the image reader.

5. The image forming apparatus according to claim 1, wherein, in a case where the chart is not formed before forming the second image, the processor is configured to create an image forming condition for the second image based on a reading result of the mark of the first image by the image reader.

6. The image forming apparatus according to claim 1, wherein the processor is configured to control the image former to form the chart on a plurality of sheets.

7. The image forming apparatus according to claim 1, further comprising a plurality of sheet containers each configured to contain different sheets from one another;
   wherein a first sheet on which the first image is to be formed and a second sheet on which the second image is to be formed and the sheet on which the chart is to be formed are fed to the image formed from a same sheet container.

\* \* \* \* \*